Aug. 5, 1941.　　　L. A. WESTON　　　2,251,557
SOLDERING TOOL
Filed March 9, 1940
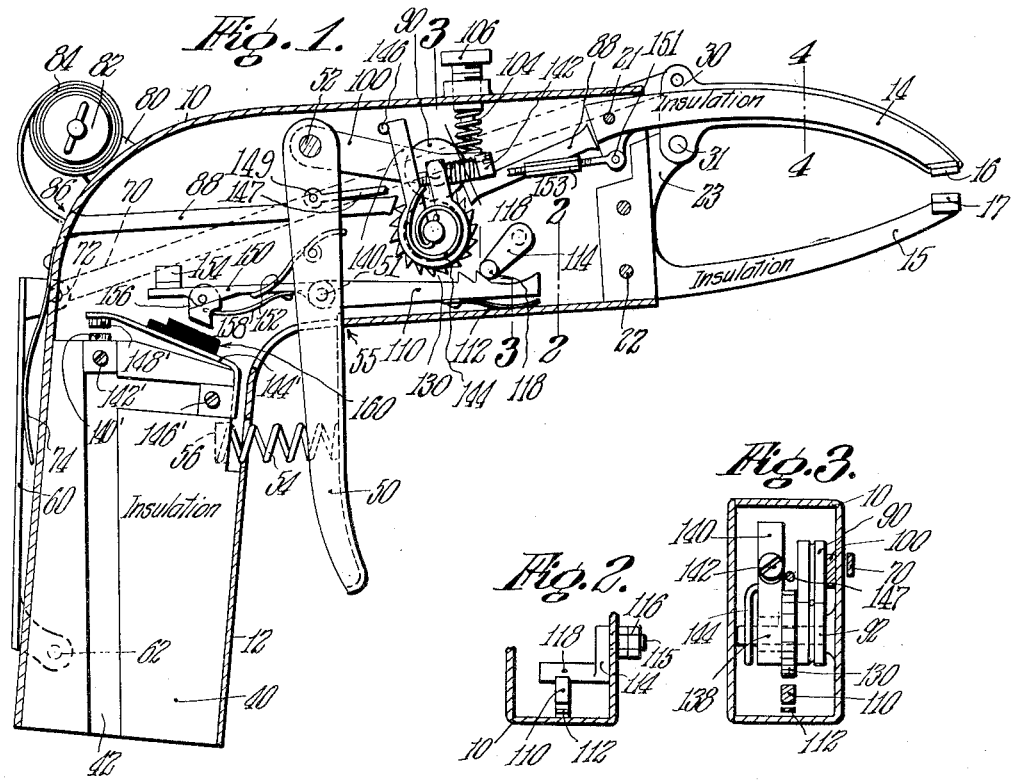
INVENTOR.
Leonard A. Weston.
BY Walter C. Ross.
ATTORNEY.

Patented Aug. 5, 1941

2,251,557

UNITED STATES PATENT OFFICE 2,251,557

SOLDERING TOOL

Leonard A. Weston, Westfield, Mass.

Application March 9, 1940, Serial No. 323,129

7 Claims. (Cl. 219—27)

My invention relates to improvements in a device for joining metallic parts together and it is directed more particularly to improvements in a device having a means for manipulating the same by a single hand whereby it is possible to use the other free hand in holding the metallic parts in relation to each other in such a position that they may be joined together.

This application is a continuation in part of my co-pending application which was serially numbered 229,717 and filed in the U. S. Patent office on September 13, 1938.

The device of my invention is characterized by a contact means for holding the parts to be joined in their desired relative positions in combination with a means for opening and closing an electrical circuit leading to contact points of the device. The device is further characterized by a crimping means for assisting in the work at the contact points and by a means for advancing and retracting the material for use in the joining operation, which may be a soldering, a welding or a brazing material.

In carrying out my invention, I preferably provide a holder which resembles a gun and by means of which the soldering, welding or brazing material is applied to the pieces which it is desired to unite. This holder carries the electrical mechanism and the controls therefor with which the flow of current is used to heat the soldering material. The holder likewise carries the soldering material and a means for moving the same into the proper position when it is desired to operate the gun.

It is an object to provide a structure of the character described having a heating element employed for heating the contacts and for simultaneously conditioning the solder for use and maintaining it in a readily meltable condition.

It is another object of my invention to provide a soldering tool of the character described which prevents the waste of solder and the application of solder in the wrong places.

It is still another object to provide a device which is light in weight and balanced in construction so as to enable working therewith over long periods of time without fatiguing the operator.

Still another object of the invention is the provision of a device for soldering, brazing or welding objects which in addition to the manually operating means for holding the parts to be joined together includes a means for crimping or binding wires or the like.

Among the other objects of my invention are first, to simplify the construction of a soldering device; second, to secure a high degree of accuracy in the performance of the work performed therewith; third, to obtain a high degree of speed in construction of the device due to its simplified construction; fourth, to attain a flexibility or a capability of adjustment by which a large variety of work can be done with the device; fifth, to attain an ease in adjustment and in repairs; and sixth, to provide an improved gun which may be made more economically and with fewer operations in the manufacture of its parts than prior devices known in the art.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Fig. 1 is a longitudinal sectional elevational view through the device embodying the novel features of my invention;

Fig. 2 is a sectional view on the line 2—2 of Fig. 1;

Fig. 3 is a similar cross-sectional view on the line 3—3 of Fig. 1;

Fig. 4 is an enlarged cross-sectional view along the line 4—4 of Fig. 1;

Fig. 5 is an enlarged sectional view through the end of the upper jaw of the device shown in Fig. 1;

Fig. 6 is an enlarged sectional view of a heating coil associated with the upper jaw of the device shown in Fig. 1;

Fig. 7 is an end-elevational view of the upper and lower jaw of the device of my invention; and Fig. 8 is a side elevational view of the upper feed roll and lever in association therewith, both of which are parts of the device of my invention.

Referring to the drawing more in detail, the invention will now be described. Like numerals refer to like parts in different figures of the drawing.

The device of my invention includes in a very broad way a hollow casing or frame member 10 which simulates a gun or revolver and has a hand gripping portion 12 at its lower rear side which has the general shape and appearance of a pistol grip. Also in association with the frame 10 are a pair of jaws at the forward end of the frame 10.

A movable upper jaw is indicated by the character 14 and a stationary lower jaw is indicated by 15. These jaws are made of Bakelite or other suitable insulating material and their extremities opposite from the frame 10 are tipped with metal contacts 16 and 17 which may be connected in an electrical circuit hereinafter to be more fully described.

The upper jaw 14 is pivoted at 21 to the frame in a suitable manner substantially as shown in Fig. 1.

The end of the lower jaw 15 opposite from the free end containing the contact 17 is shaped like a block so as to secure the jaw between the side walls of the frame 10 by means of a bolt or bolts 22 or other suitable means. Upon the upper extremity of this end of the lower jaw, there is a lug portion 23.

A crimper 30 is pivoted at 31 to the lug portion 23. The crimper 30 follows closely along side of the upper jaw 14 substantially as shown and is adapted to move independently of the jaw. This crimping device has a foot 32 at its lower extremity with which it is possible to crimp the work to be joined, if such is desired, when the jaws are closed.

The upper jaw has a longitudinally-extending bore 36 through its lower side through which a strip of soldering material later to be described may be fed. This passageway 36 extends through the contact 16, as shown in Fig. 5, whereby it is possible to feed the soldering material to the work between the contacts 16 and 17.

The upper jaw 14 also has an upper passageway 38 as may be seen in Fig. 4. This passageway extends to the contact 16 and through it electrical wires, later to be described, extend for purposes of heating the contact 16. A similar passageway for a wire leading to the lower contact 17 is provided in the lower jaw 15.

In the grip 12, there is a block of insulating material 40 provided with a groove 42 which is provided for electrical wires as will hereinafter be more fully explained.

The upper end of a trigger 50 is pivoted at 52 in reference to the frame 10 and a spring 54, disposed in a socket 56 in the block 40, abuts the free end of the trigger substantially as shown, so as to urge the trigger 50 outwardly from the grip 12 towards the frame member 10 which serves as a stop at 55.

The trigger has spaced side parts in its upper portion which swing on the pivot 52 against the spring action of the spring 54.

A plate 60 is provided on the back of the grip 12 and it is pivoted in relation to the grip 12 at 62 substantially as shown. The plate is also pivoted at 72 at its upper end to a connecting link 70 which extends therefrom to the crimper 30. A spring 74 urges the plate 60 outwardly from the grip member.

As the plate 60 is pressed inwardly relative to the frame 12 by the operator's hand when he squeezes the grip, the connecting link 70 forces the crimper 30 to move downwardly at its free end relative to the frame 10.

A bracket 80 is associated with the frame 10 which carries an arbor 82 for a supply of brazing material 84 which may be in the form of a coil as is indicated. The brazing material is preferably in the form of a coil of wire and it passes through an opening 86 in the frame and forwardly through a guide tube 88 which is associated with the frame. The tube extends through the frame 10 and leads the material 84 between grooved feed wheels 90 and 92, then forwardly again through a continuation of the guide tube which is also associated with the frame 10 and which extends forwardly from the feed wheels 90 and 92 to the channel or passageway 36 in the upper jaw 14.

A lever 100 is pivoted at one end to the pin 52 as shown in Fig. 8 which also serves as a pivot for the trigger 50 and at the other end, carries a lower feed roll 90 rotatable thereon. The tip of the lever 100 has a tail or lug 102 thereupon as shown in Fig. 8. A tensioning means operates on the lug 102 which consists of a spring 104 bearing upon the lug 102 and which is urged downwardly by means of an adjusting screw 106 which bears upon the lug. This tensioning means causes the feed rolls 90 and 92 to yieldingly engage the soldering material by virtue of the fact that the feed roll 92 may be moved closer to or further from the feed roll 90, all as may be desired, depending upon the thickness of the soldering material which is passing between the feed rolls 90 and 92.

A pawl 110 is pivoted upon the trigger 50 and a spring 112 under the pawl which is secured to the pawl and which secures on the frame urges the pawl upwardly. A lever 114 pivoted by a stud 115 to the frame 10 is clamped in position by a nut or nuts 116 which serve as a locking means. The lever 114 has an arm 118 which overlies the pawl 110. The lever 114, being pivoted, is swingable through an arc and may be locked in any desired position so that the action of the pawl may be varied, according to the desires of the operator for purposes hereinafter to be more fully explained.

Teeth on the upper side of the pawl 110 and teeth on a ratchet 130, which is secured to the lower feed roll 92, come into engagement when the upward action of the spring 112 forces the pawl 110 upwardly.

That is to say, as the pawl 110 is pulled rearwardly by the trigger 50, the spring 112 urges the pawl upwardly from the frame 10. The curvature on the upper side of the pawl is such that it enables the pawl to move upwardly as it is moved rearwardly. By moving upwardly, the teeth of the pawl engages the teeth of the ratchet 130.

By adjustment of the lever 114, the arm 118 thereon which overlies the pawl 110 may be positioned so as to control the period of engagement of the pawl and the ratchet and to thereby control the feeding action of the feed rolls and to consequently control the length of the material fed therethrough upon the movement of the trigger.

The arm 118 urges the pawl downwardly as the pawl is continued outwardly due to the curvature of the upper side of the pawl as shown so that the pawl disengages the ratchet whereby the ratchet and the feed roll is not rotated by the pawl.

By thus adjusting the position of the lever 114 and its component arm or cam 118 relative to the pawl 110, the length of the soldering material which is fed through the feed rolls 90 and 92 per stroke is obviously controlled.

A clutch 140 is disposed around a hub 138 of the ratchet 130 and of the feed roll 92.

An adjusting screw 142 and a spring 144 in association therewith as shown tightens the clutch 140. The spring 144 acts upon the clutch in a counterclockwise manner so as to swing the clutch, the ratchet and the roll 92 in counterclockwise movements to a position where the arm of the clutch abuts the stop 146 which is secured to the frame 10.

Thus it will be seen that as the trigger is pulled rearwardly, the pawl engages the ratchet so as to rotate the ratchet and the clutch and the feed roll 92 in a clockwise motion. As the trigger reaches the end of its back stroke the spring 144 urges the clutch, the ratchet and the feed roll to their original positions where the clutch abuts the stop 146.

A connecting link 147 is pivoted upon the trigger at 149 and at the upper jaw at 151. A turnbuckle 153 is provided upon this connecting link so as to enable the operator to adjust the same. As the trigger is moved rearwardly, the link 147 acts upon the upper jaw so as to pull the jaw downwardly to a point where the contact 16 meets the contact 17.

In the block 40 in the grip 12 there is provided a contact member 140' which is connected to a terminal 142'. A spring-like member 144' is secured to the block substantially as shown and carries another terminal 146'. To the end of this spring-like member another contact member 148' is secured and overlies the first contact member 140' so that the two contact members 140' and 148' may be brought into contacting relation to complete a circuit.

Pivoted to the trigger at 51 is a lever 150 which has a spring means 152 urging said lever 150 upwardly. A stop 154 which is secured to the frame guides the lever 150 so that when the lever 150 is moved rearwardly due to the action of the trigger to which it is secured, the lever 150 slides under the stop 154.

A pawl 156 is pivoted to the lever 150 and a spring 158 likewise secured to the lever holds the pawl in position.

An insulated block 160 is carried upon the spring 144' and it has a notch in its upper end, as shown. As the lever is moved rearwardly, the pawl engages the block so as to depress member 144' and to form a contact between the points 140' and 148'. As the trigger is pulled further to the rear, the pawl slips into the notched portion of the block so as to release the spring 144' and to break the contact between the points 140' and 148'.

In some cases, it may be desired to preheat or maintain the material in a heated condition so that it is more readily heated by the contact. For this purpose a resistance or heating coil 150 is placed around the jaw between flanges as shown.

Electrical wires carrying the supply of electricity are carried in the groove of the block, one wire being connected to one of the contacts 16 or 17, while the other wire is connected to a terminal to one of the contacts such as 146' and a wire extending from the other contact to the other terminal so that when the contacts 140' and 148' are joined together and when the circuit is completed through the contacts 16 and 17 and through the working pieces disposed therebetween, the gun is in working operation.

By pulling the trigger further to the rear, the upper jaw is moved upwardly so as to break the circuit and the contacts 140' and 148' are likewise broken.

The heating coil leads off from the circuit at any desired point and it may be so wired that the coil may be in operation continually irrespective of the operation of the contacts 16 and 17.

The various parts of the device now having been described as to their construction and arrangement, it will now be shown how they are co-operatively related so as to produce an operative device.

The grip is embraced in the hand of the operator and may be squeezed so that the plate member 60 is depressed whereby the crimper 30 is actuated as hereinbefore explained. The crimping means is adapted to bend or to hold the work being joined. It is particularly adapted for use on wires which are being joined to pieces of metal.

By pulling the trigger rearwardly, the jaw 14 is moved downwardly so that the contacts are urged towards one another to embrace the parts which are to be joined together.

It is to be understood that the crimping operation and the clamping operation can be done independently of each other if it is so desired. On the other hand, they may be used together.

With the objects to be joined together being held or clamped between the contacts 16 and 17 of the jaws 14 and 15, due to the action of the trigger, and being held by the jaws, a suitably heated soldering material may be contacted with the objects and caused to join the objects together. The continued pressure on the trigger will feed the soldering material to the contacts. When the trigger is moved further rearwardly sufficiently to join the contacts 140' and 148', the electrical circuit is closed and the contacts 16 and 17 are heated. The continued movement breaks the circuit and by releasing the trigger the solder is pulled back.

The material for the joining operation may take the form of solder or various other metals which are adapted for brazing or welding operations. As the character of the same may vary considerably, a specific metal is not herein mentioned, wherefor the metal is referred to as a brazing material and according to the invention is in the form of a strip or wire.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. A soldering tool comprising in combination, a frame adapted to be grasped by the hand, jaws on said frame having electrical contacts for embracing objects to be joined together, supports for a supply of brazing material disposed upon said frame, means for conducting current to said jaws, means for guiding the brazing material so that its end lies adjacent said jaws at the contacts thereof, a trigger pivoted in said frame, feeding means engaging the brazing material adapted alternately to feed the same forwardly and to retract the same rearwardly, and connections between said trigger and said feeding means whereby said feeding means is actuated by said trigger.

2. A soldering tool comprising in combination, a frame having a hand gripping portion at one end thereof, a pair of jaws on said frame having electrical contacts for embracing objects to be joined together, means for conducting current to said jaws, means for supporting a supply of brazing material disposed upon said frame, means for guiding the brazing material to the jaws at the junction of the contacts thereof, a trigger pivoted in said frame, feeding means engaging the brazing material adapted to feed alternately the same forwardly and to retract the same rearwardly, and connections between said trigger and said feeding means whereby the latter means is actuated by the former.

3. A soldering tool comprising in combination, a frame adapted to be grasped by the hand, jaws on said frame having electrical contacts for embracing objects to be joined together, means for conducting current to said jaws, supports for a supply of brazing material disposed upon said frame, means for guiding the brazing material so that its end lies adjacent said jaw at the contact thereof, a trigger pivoted in said frame, a feeding means engaging the brazing material adapted to feed alternately the same forwardly and rearwardly, and connections between said trigger and said feeding means whereby said feeding means is actuated by said trigger.

4. A soldering tool comprising in combination, a frame having a hand-gripping portion at one end thereof, a pair of jaws on said frame having electrical contacts for embracing objects to be joined together, means for conducting current to said jaws, crimping means in association with said jaws, means for supporting a supply of brazing material, means for guiding the brazing material so that its end lies adjacent the contacts on said jaws, an actuating member depressible in the hand-gripping portion when said frame is embraced in the hand, a connection between said actuating member and said crimping means, a trigger pivoted in said frame, feeding means engaging the brazing material adapted to alternately feed the same forwardly and to retract the same rearwardly, and connections between said feeding means and said trigger whereby said feeding means is actuted by said trigger.

5. A soldering tool comprising in combination, a frame adapted to be grasped by the hand, a pair of jaws on said frame having electrical contacts for embracing objects to be joined together, means for conducting current to said jaws, crimping means in association with said jaws, means for supporting a supply of brazing material in strip form, means for guiding the brazing material so that the end thereof lies adjacent the contacts on said jaws, an actuating member depressible in the hand-gripping portion when said frame is embraced in the hand, a connection between said actuating member and said crimping means for actuating said crimping means relative to said jaws, a trigger pivoted in said frame, feeding means engaging the brazing material and adapted to alternately feed the same forwardly and to retract the same rearwardly, and connections between said feeding means and said trigger whereby said feeding means is actuated by said trigger.

6. A soldering tool comprising in combination, a frame having a hand-gripping portion at one end thereof, jaws on said frame having electrical contacts for embracing objects to be joined together, means for conducting current to said jaws, crimping means in association with said jaws, means for supporting a supply of brazing material, means for guiding the brazing material so that its end lies adjacent the contact on said jaws, an actuating member depressible in the hand-gripping portion when said frame is embraced in the hand, a connection between said actuating member and said crimping means, a trigger pivoted in said frame, feeding means engaging the brazing material and adapted to alternately feed the same forwardly and to retract the same rearwardly, and connections between said feeding means and said trigger whereby said feeding means is actuated by said trigger.

7. A soldering tool comprising in combination, a frame adapted to be grasped by the hand, a pair of jaws on said frame having electrical contacts for embracing objects to be joined together, means for conducting current to said jaws, means for supporting a supply of brazing material in strip form, means for guiding the material so that its end lies adjacent said jaws at the contacts thereof, feeding means engaging the strip material and adapted to feed the same forwardly and to retract the same rearwardly, and circuit opening and closing means carried by said frame and operable by said feeding means.

LEONARD A. WESTON.